(12) United States Patent
Zlatnik et al.

(10) Patent No.: US 9,965,449 B2
(45) Date of Patent: May 8, 2018

(54) PROVIDING PRODUCT WITH INTEGRATED WIKI MODULE

(71) Applicants: Pavel Zlatnik, Prague (CZ); David Valis, Prague (CZ); Ivo Cermak, Prague (CZ)

(72) Inventors: Pavel Zlatnik, Prague (CZ); David Valis, Prague (CZ); Ivo Cermak, Prague (CZ)

(73) Assignee: CA, Inc., New York, NY (US)

( * ) Notice: Subject to any disclaimer, the term of this patent is extended or adjusted under 35 U.S.C. 154(b) by 252 days.

(21) Appl. No.: 14/216,336

(22) Filed: Mar. 17, 2014

(65) Prior Publication Data

US 2015/0261731 A1 Sep. 17, 2015

(51) Int. Cl.
*G06F 17/22* (2006.01)
*G06F 17/24* (2006.01)
*G06F 17/30* (2006.01)

(52) U.S. Cl.
CPC .......... *G06F 17/2235* (2013.01); *G06F 17/24* (2013.01); *G06F 17/30893* (2013.01)

(58) Field of Classification Search
CPC .................................................. G06F 17/3089
USPC ........................................................ 715/234
See application file for complete search history.

(56) References Cited

U.S. PATENT DOCUMENTS

| | | | | |
|---|---|---|---|---|
| 7,996,850 B2 * | 8/2011 | Massmann | ............ | G06F 9/4435 709/228 |
| 8,196,039 B2 * | 6/2012 | Curtis | ............... | G06F 17/30705 715/243 |
| 8,219,900 B2 * | 7/2012 | Curtis | ............... | G06F 17/30905 707/999.107 |
| 8,370,740 B2 * | 2/2013 | Zinkovsky | ............... | G06F 8/70 715/255 |
| 8,560,956 B2 * | 10/2013 | Curtis | ............... | G06F 17/21 715/205 |
| 8,775,930 B2 * | 7/2014 | Curtis | ............... | G06F 17/30873 715/205 |
| 8,819,542 B2 * | 8/2014 | Cudich | ............... | G06F 17/2288 709/203 |
| 8,832,151 B2 * | 9/2014 | Saha | ............... | G06F 17/30867 707/784 |
| 8,869,023 B2 * | 10/2014 | Berkner | ............... | G06F 17/211 715/200 |
| 8,918,713 B2 * | 12/2014 | Sah | ............... | G06F 17/3089 715/234 |

(Continued)

*Primary Examiner* — Mohammed-Ibrahim Zuberi
(74) *Attorney, Agent, or Firm* — Baker Botts L.L.P.

(57) ABSTRACT

Systems and methods include instantiating an application on first and second display devices. The application includes objects and an integrated wiki module. The integrated wiki module includes object wiki pages associated with the objects. The first display device is controlled to display a control module when an object is displayed thereon and to display an object wiki page in response to receiving a selection of the control module. The object wiki page includes content associated with the object. Instructions are received to change the content included in the object wiki page. The second display device is controlled to display the control module when the object is displayed on the second display device and to display the object wiki page including the changed content in response to receiving a selection of the control module after receiving the instructions to change the content.

18 Claims, 11 Drawing Sheets

(56) References Cited

U.S. PATENT DOCUMENTS

| | | | |
|---|---|---|---|
| 8,924,850 B1* | 12/2014 | Ramani | G06F 17/2247 715/234 |
| 8,954,861 B1* | 2/2015 | Takahashi | G06F 17/30893 715/741 |
| 8,965,880 B2* | 2/2015 | Mizuno | G06F 17/30867 707/722 |
| 9,069,733 B1* | 6/2015 | Meredith | G06F 17/3089 |
| 9,087,127 B1* | 7/2015 | Zlatnik | G06F 17/3082 |
| 9,146,909 B2* | 9/2015 | Khorashadi | G06F 17/30905 |
| 2008/0010338 A1* | 1/2008 | Curtis | G06F 17/3089 709/203 |
| 2008/0010341 A1* | 1/2008 | Curtis | G06F 17/21 709/204 |
| 2008/0010345 A1* | 1/2008 | Curtis | G06F 17/30861 709/205 |
| 2008/0010386 A1* | 1/2008 | Curtis | G06F 17/3089 709/246 |
| 2008/0010387 A1* | 1/2008 | Curtis | G06F 17/3089 709/246 |
| 2008/0010388 A1* | 1/2008 | Curtis | G06Q 10/10 709/246 |
| 2008/0010590 A1* | 1/2008 | Curtis | G06F 17/30905 715/246 |
| 2008/0010609 A1* | 1/2008 | Curtis | G06F 17/3089 715/810 |
| 2008/0040661 A1* | 2/2008 | Curtis | G06F 17/3089 715/243 |
| 2008/0065769 A1* | 3/2008 | Curtis | G06F 9/542 709/226 |
| 2008/0126944 A1* | 5/2008 | Curtis | G06F 17/30896 715/733 |
| 2009/0148124 A1 | 6/2009 | Athsani et al. | |
| 2010/0153881 A1 | 6/2010 | Dinn | |
| 2011/0161174 A1 | 6/2011 | Simms et al. | |
| 2012/0069131 A1* | 3/2012 | Abelow | G06Q 10/067 348/14.01 |
| 2014/0156726 A1* | 6/2014 | Bohlmann | H04L 69/18 709/203 |

\* cited by examiner

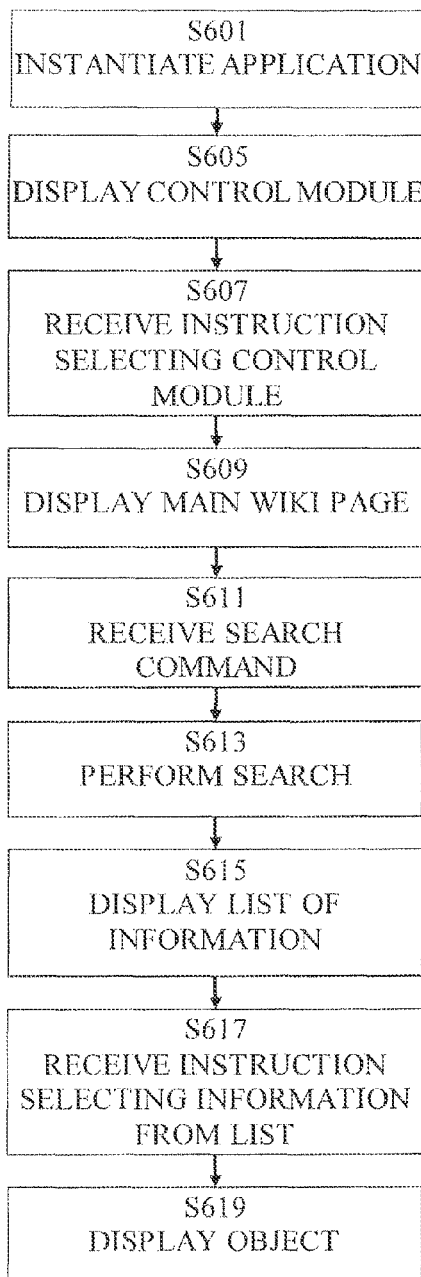
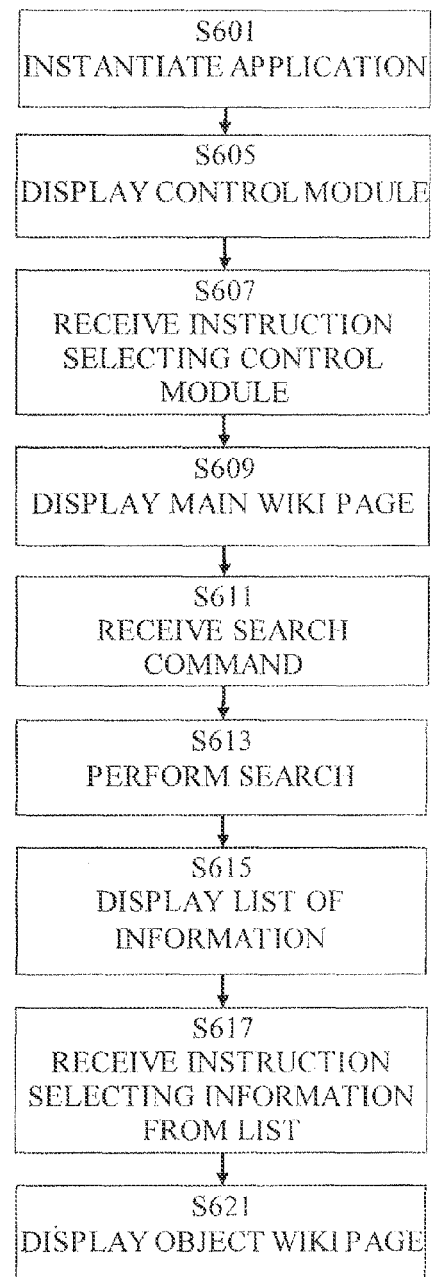
FIGURE 6A
FIGURE 6B

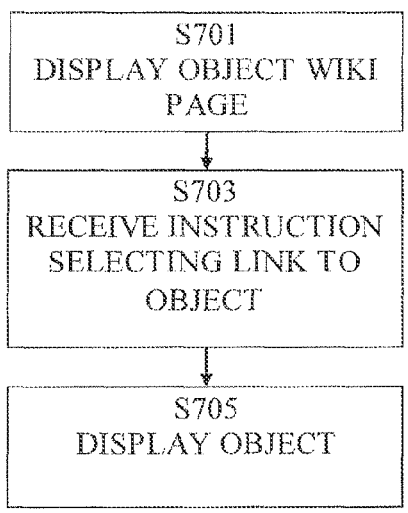
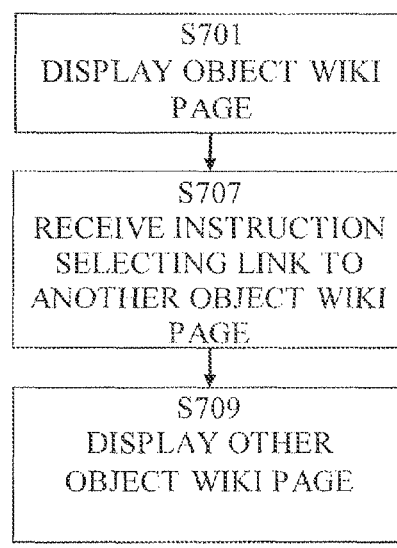
FIGURE 7A
FIGURE 7B

PROVIDING PRODUCT WITH INTEGRATED WIKI MODULE

BACKGROUND

The present disclosure relates to user interfaces, product interaction, and collaboration and, more specifically, to a system and method for providing product interaction and collaboration.

Existing computing systems may provide a user with a tutorial or help feature. This tutorial feature may be a module that allows the user to view content that is stored locally or remotely. The content may be electronic versions of documents that are in one or more electronic file formats. The user may use these documents to understand how to use an application or an object of the application.

The concept of a wiki is known. A wiki is a set of computer-readable instructions executed by a computer, such as a server, that may allow users to freely add, modify, or delete content in collaboration with others. Wikis are typically accessed through one or more web browsers. Text is usually written using a simplified markup language or a rich-text editor. While a wiki is a type of content management system, it may differ from a blog or most other such systems in that the content may be created without any defined owner or leader, and wikis have little implicit structure, allowing structure to emerge according to the needs of the users. Known wikis may support hyperlinks and may include a simple text syntax for creating new pages and crosslinks between internal pages on the fly. A wiki is unusual among group communication mechanisms in that it allows the organization of contributions to be edited in addition to the content itself.

BRIEF SUMMARY

According to an aspect of the present disclosure, systems and methods disclosed herein may include instantiating a first instance of an application on a first display device. The application may include a plurality of objects and an integrated wiki module. The integrated wiki module may be integrated into the application and may include a plurality of object wiki pages associated with the plurality of objects. The first display device may be controlled to display a first control module when a first object of the plurality of objects is displayed on the first display device. Further, the first display device may be controlled to display a first object wiki page of the plurality of object wiki pages in response to receiving a selection of the first control module via the first instance of the application. The first object wiki page may include first content associated with the first object. Instructions to change the first content included in the first object wiki page may be received via the first instance of the application, such that the first content becomes changed first content. In addition, systems and methods disclosed herein may include instantiating a second instance of the application on a second display device. The second display device may be controlled to display the first control module when the first object of the plurality of objects is displayed on the second display device. In addition, the second display device may be controlled to display the first object wiki page including the changed first content in response to receiving a selection of the first control module via the second instance of the application after receiving the instructions to change the first content via the first instance of the application.

Other features and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

FIG. 6A illustrates a process of displaying a main wiki page of an application with an integrated wiki module that enables a user to select and display objects in the application. FIG. 6B illustrates a process of displaying a main wiki page of the application that enables a user to select and display object wiki pages associated with objects in the application.

FIG. 7A illustrates a process of displaying an object wiki page associated with an object in an application that enables a user to select and display the object or another object in the application. FIG. 7B illustrates a process of displaying an object wiki page associated with an object in an application that enables a user to select and display another object wiki page associated with the object or another object in the application.

FIG. 8 illustrates an interface for an application including an integrated wiki module.

FIG. 9 illustrates an object wiki page associated with an object in the application of FIG. 8.

DETAILED DESCRIPTION

Figure 1:
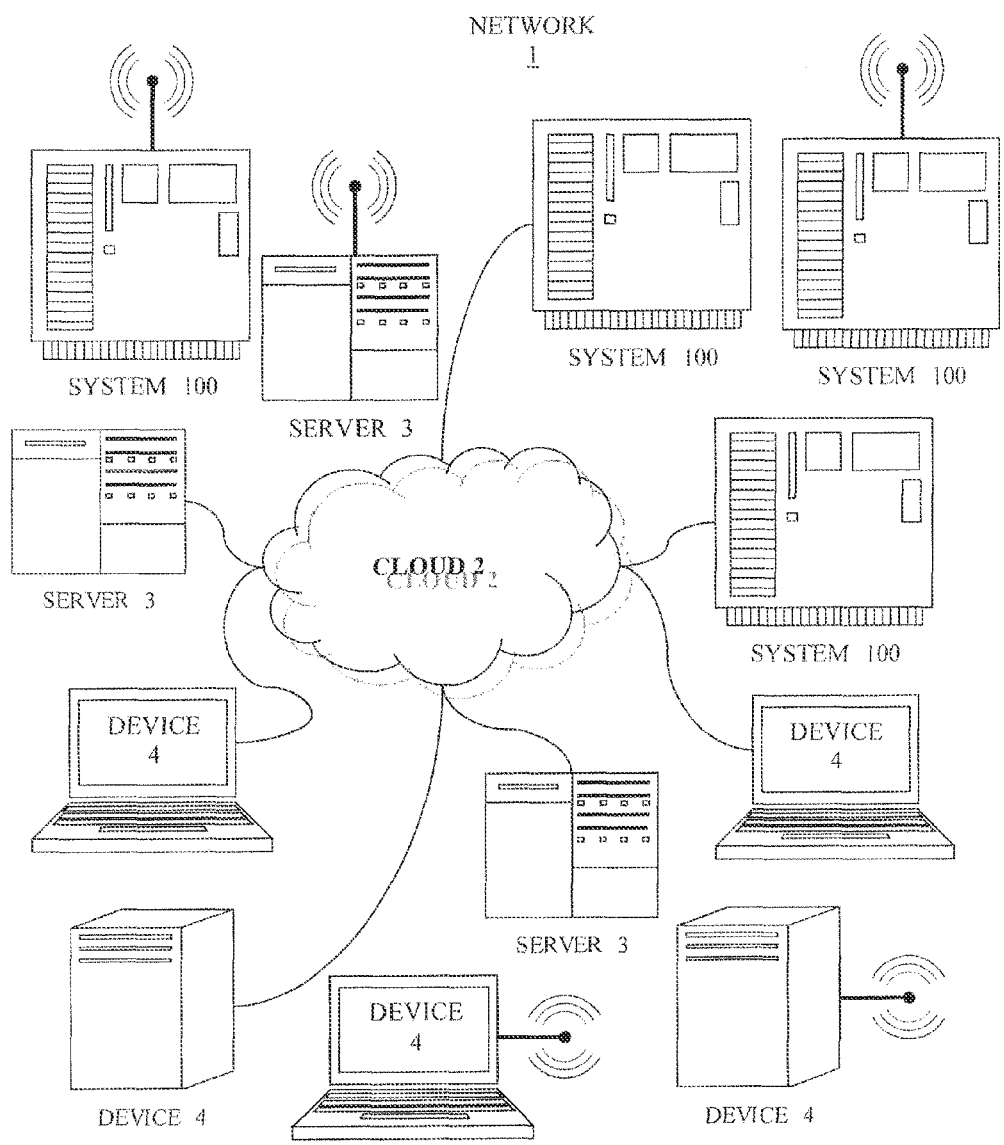
FIG. 1 is a schematic representation of a network including devices serving and instantiating applications with integrated wiki modules.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to mainframes in cloud computing, systems and methods disclosed herein may be related to architecture and information technology ("IT") service and asset management in cloud computing, as well as usability and user experience in middleware and common services. Systems and methods disclosed herein may be applicable to a broad range of applications that monitor various parameters associated with various disciplines, such as, for example, IT systems and other activities of importance to the user.

Referring now to computing systems, certain systems may provide a user with a tutorial or help feature. This tutorial feature may be a module that allows the user to view electronic versions of documents. These electronic versions of documents may be in one or more electronic formats such as, for example, Portable Document Format ("PDF") or document file format ("DOC"). The user may use the documents to understand how to use an application or an object of an application. Existing systems may only be able to provide electronic versions of documents to the user. However, in some instances, the user may want to make or create her own guide and/or share her guide with other users.

In particular, a user using a product on a computer, such as an application, may want to make detailed notes about what she is doing or what she can do with objects in the application. In existing systems, there is no easy way how to embed these kinds of hints for the user and others into the product itself. To address this and other needs, configurations of the systems and methods disclosed herein may provide the ability to add notes to the product, as well as the ability to add the rich content that a wiki system provides, such that one or more users may also collaborate directly within the product.

In systems disclosed herein, a wiki feature may be integrated directly into an application, such as a web user-interface or cloud application, like CA Chorus™ or any other application with an interface that permits a plurality of users to be logged in to the application and/or to operate the application at the same time. The wiki feature is especially useful when integrated into for web applications running remotely (e.g., outside of user personal PC) that support a multi-user user interface. By integrating such a wiki feature directly into an application, such systems provide a completely new way to utilize a wiki that may allow each user to add rich content (e.g., tutorials, training materials, advice, instructions, reminders, links to webpages, links to other wiki entries, videos, charts, tables, images, audio recordings, and other content) to the application in that can be accessed and edited by other users in real time. Further, the wiki features may permit users to see a history of edits and changes made to the wiki content. Consequently, control modules may be integrated into the application to open wiki pages associated with objects in the application, to modify such wiki pages, and to view a history of modifications to such wiki pages. In some configurations, control modules may enable an ability to revert a wiki page to a previous version.

In existing systems, a user may open or activate an object (e.g., a data set, a table, a window, a sub-application, user information, a setting screen, an error notification) in an application. Certain object features (e.g., action buttons, menus, or other controls that launch some action, such as filter, sort, open, help, display, activate, start, search, select, delete, cancel, print, modify, set property) may be provided in conjunction with (e.g., displayed with, displayed as part of, displayed at the same time as, displayed as active) the object. In systems disclosed herein, a new object feature, such as a button, menu, or other control, may be provided in conjunction with the object. This new object feature, when selected and activated, initiates a dedicated action to open a wiki page. The wiki page may be opened in a new window, for example. Accordingly, each object in the application may be associated with a dedicated wiki page for that object, such that a plurality of wiki pages corresponding to a plurality of objects are associated with the application. In some configurations, all of the objects in the application may be associated with respective dedicated wiki pages. In other configurations, only a portion of the objects in the application may be associated with respective dedicated wiki pages. In certain configurations, a dedicated wiki page may be associated with the application itself. Each wiki page also may be associated or linked with other wiki pages, such that a multilevel wiki page structure may exist. In addition, one or more wiki pages for respective objects may provide links to the wiki pages for other related objects.

Consequently, one or more users may add notes, print screens with some description, videos, links to useful webpages, and/or other content that is supported by the wiki feature integrated with the application. In certain configurations, only a subset of users may have permission to edit one or more wiki pages (e.g., based on administrator rights, power user status for an object associated with a wiki page, employment status or position, sign-in status). In some configurations, one or more users may not have permission to read or edit certain wiki pages. In additional configurations, certain users may only be permitted to edit a predetermined number of wiki pages or to make a predetermined number of edits to a particular wiki page in a given period of time. In particular configurations, a wiki page may open in a read only mode by default and an additional action may be required to activate an edit mode in which such wiki page may be edited. In any event, every user with appropriate access rights may browse the content of the respective wiki page associated with a specific object and update, enhance, edit, revise and/or add content for herself and/or other users. Accordingly, the systems disclosed herein may provide for a user-created help mechanism for each object that includes user notes and rich content associated with the object. Further, such systems with wiki features may ensure it is easy and fast for a user to create content that may be immediately used by other users.

In systems disclosed herein, another feature, such as a button, menu, or other control, may be provided in conjunction with the application itself. This other feature, when selected and activated, initiates a dedicated action to open a main wiki page. This other feature may be provided on a main window of the application, in a menu, or elsewhere within the application. In some configurations, the other feature may be provided in conjunction with one or more objects in the application. The main wiki page may be provided in a new window and may include a list of each wiki page associated with a respective object or, conversely, a list of each object with an associated wiki page. The main wiki page may include a search interface that a user may use to search all of the wiki pages associated with objects in the application for particular content. The search interface may accept search terms, keywords, topics, and may also include various filters. Consequently, the wiki feature integrated with the application may supplement or supplant the traditional help content provided by technical engineers employed by the application's distributors. Moreover, the systems disclosed herein may enable the user to make notes, provide help, and leave hints, in collaboration with others, for herself or others in just of a small fraction of time. Further, such content may have a direct relation to what it describes. In some configurations, wiki pages may open in read only mode when opened via the main wiki page or via the search interface, but may open in edit mode when opened via the new feature provided in conjunction with the object itself (e.g., a wiki page may open in read only mode when the wiki page is opened by clicking a link from the main wiki page, but may open in edit mode when the wiki page is opened by clicking a button provided in conjunction with the object). In other configurations, the mode in which the wiki page opens may be indifferent with respect to how the wiki page was opened.

System and methods disclosed herein may provide an application with an integrated wiki feature that may allow the user to search for content (e.g., wiki content) associated with an object (e.g., via a search command provided via a main wiki page); to add, edit, revise, and delete content associated an object (e.g., via a wiki page associated with the object), and to share content (e.g., via the wiki page) with other users. Such systems and methods may provide an integrated wiki feature. The integrated wiki feature may be integrated into an application. Such systems and methods may present the user with an option to search for content. For example, a wiki page that addresses how to migrate datasets in an application may have a header, "How to Migrate a Dataset," and a set of key phrases comprising "Dataset," a description of a task (e.g., migration), a name of a tool that is used for migrating a dataset, and a reason for performing the task (e.g., to free up hard drive space). The header and the one or more key phrases may be used to search for a wiki page having particular content. Moreover, each wiki page may be associated with a name of an object in the application. For example, continuing from the last example, the wiki page may be associated with a name of an object in the application that is used tier migrating a dataset or a name of an object in the application that is a part of a structure or tree for migrating a dataset. If the wiki page is associated with a name of an object, then such systems and methods may identify the wiki page as a wiki page that is related to the object. Such systems and methods may also provide an option to display the wiki page to the user. For example, such systems and methods may display a button with the option to display an associated wiki page next to the object on a screen, and the user may select the option by clicking on the button with a cursor. When the user selects the option to view the wiki page, such systems and methods may further present the related wiki page to the user. Moreover, such systems and methods may permit the user to edit, add to, or revise the wiki page.

In such systems and methods disclosed herein, one or more wiki page may initially contain default content that is provided by a service provider (e.g., a manufacturer, a distributor, a licensor). For example, a company that develops an application with a plurality of objects may provide default content for wiki pages associated with each of the plurality of objects in the application. The wiki pages may help the user understand how to perform one or more actions with each of the plurality of objects. The wiki page associated with each object may be accessible by a group of users that are running the application on different devices. Thus, when a user edits a wiki page, the revised content may be immediately available to many users. Nevertheless, in some configurations, revisions may need to be first approved by an administrator before other users may access the revised content.

When a user chooses to search for content, such systems and methods may search among the wiki pages that are accessible to that user. The search may comprise finding or identifying one or more wiki pages that are each associated with one or more search terms. The one or more search terms may comprise a header, key phrases, or names of objects. Such systems and methods may then present the one or more wiki pages to the user. Presenting the one or more wiki pages may comprise displaying the headers, titles, associated objects, and/or preview images for each of the one or more wiki pages in a list. Upon viewing the list, the user may select a particular wiki pages from the list.

Systems and methods disclosed herein may provide an interactive way for users to share and obtain information about an application's features. Unlike existing systems and methods that only provide access to written content, such systems and methods may provide users with rich, user-created content presented via wiki pages. The rich content may comprise data on performing a task in the application. By accessing the rich content, users may learn how to perform the task. Additionally, users can create their own content and add it to the wiki page for a related object. For example, experienced engineers can create a tutorial for a beginner engineer in a field. Moreover, after such content is created and stored, it can be used by future generations of users. Service providers that notice that particular content in a wiki page is useful may also include such content as a factory default in a next release of the application.

Referring now to FIG. 1, a network 1 for a user to access and use an application with wiki features (e.g., a wiki module) integrated therein. Network 1 may comprise one or more clouds 2, which may be public clouds, private clouds, or community clouds. Each cloud 2 may permit the exchange of information and services among users that are connected to such clouds 2, in certain configurations, cloud 2 may be a wide area network, such as the Internet. In some configurations, cloud 2 may be a local area network, such as an intranet. Further, cloud 2 may be a closed, private network in certain configurations, and cloud 2 may be an open network in other configurations. Cloud 2 may facilitate wired or wireless communications of information among users that are connected to cloud 2.

Network 1 may comprise one or more servers 3 and other devices operated by service providers and users. Network 1 also may comprise one or more devices 4 utilized by users. Service providers and users may provide information to each other utilizing the one or more servers 3, which connect to the one or more devices 4 via cloud 2. Servers 3 may comprise, for example, one or more of general purpose computing devices, specialized computing devices, mainframe devices, wired devices, wireless devices, monitoring devices, infrastructure devices, and other devices configured to provide information to service providers and users. Devices 4 may comprise, for example, one or more of general purpose computing devices, specialized computing devices, mobile devices, wired devices, wireless devices, passive devices, routers, switches, mainframe devices, monitoring devices, infrastructure devices, and other devices utilized by service providers and users. Exemplary items may include network 1, cloud 2, servers 3, and devices 4.

Moreover, network 1 may comprise one or more systems 100 that may provide an application with wiki features integrated therein. System 100 may be, for example, one or more of a general purpose computing device, a specialized computing device, a wired device, a wireless device, a mainframe device, an infrastructure device, a monitoring device, and any other device configured to provide an application with wiki features integrated therein. System 100 may also be configured to collect data from one or more data sources (e.g., servers, sensors, networks, interfaces, other devices). System 100 may collect information from network 1, cloud 2, servers 3, devices 4, and other devices connected to cloud 2. System 100 may connect to cloud 2 and monitor network 1, cloud 2, servers 3, devices 4, and other devices connected to cloud 2 for available information. The available information may be user information, access information, performance information, infrastructure information, software or application information, usability information, and other information provided by service providers and users. By collecting the available information from network 1, cloud 2, servers 3, devices 4, and other devices connected to cloud 2, system 100 may perform one or more processes associated with using the application with wiki features integrated therein. These one or more processes may comprise accessing a wiki page associated with an object in the application; editing, adding to, deleting from, or otherwise revising the content of the wiki page associated with the object; sharing the wiki page with other users; accessing a main wiki page that aggregates information about the respective wiki pages associated with a plurality of objects in the application; and enabling navigation (e.g., via searching, filtering, napping, or other organizational methods) among the respective wiki pages.

In some configurations, one or more of servers 3 and devices 4 may comprise system 100. In other configurations, system 100 may be separate from servers 3 and devices 4.

Figure 2:
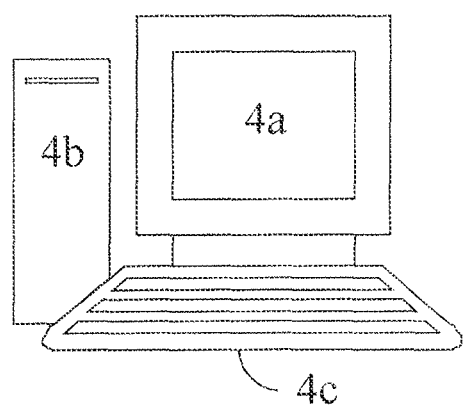
FIG. 2 is a schematic representation of a system configured to display the content of applications with integrated wiki modules.

FIG. 2 shows an exemplary configuration of device 4. Device 4 may include a display 4a (e.g., a monitor, a projector, a touch screen, a solid state display system), a processing device 4b (e.g., a processor, a computer, an integrated circuit), and an input device 4c (e.g., a keyboard, a mouse, a trackpad, a touch screen or other touch interface, a motion sensor, a microphone, a camera). Display 4a, processing device 4b, and input device 4c may be integrated into a single unit or may be distinct components connected to one another through one or more wireless or wired connection mechanisms. Processing device 4b may receive instructions from systems 100, servers 3, and/or other devices 4 via cloud 2. Display 4a may be controlled to display various graphical or textual elements based on the instructions received by processing device 4b. Input device 4c may be used to input instructions into processing device 4b, which may transmit the instructions to systems 100, servers 3, and/or other devices 4 via cloud 2 if appropriate. For example, processing device 4b may receive instructions to instantiate an instance of a cloud-based application on display 4a from system 100, and a user may provide instructions to the cloud-based application running on system 100 via input device 4c. In such configurations, system 100 may thereby be responsible for instantiating (e.g., representing, causing the display thereof, providing access to) the instance of the cloud-based application on display 4a. In some configurations, processing device 4b may similarly execute local instructions, rather than instructions via cloud 2 from systems 100, servers 3, and other devices 4.

Figure 3:
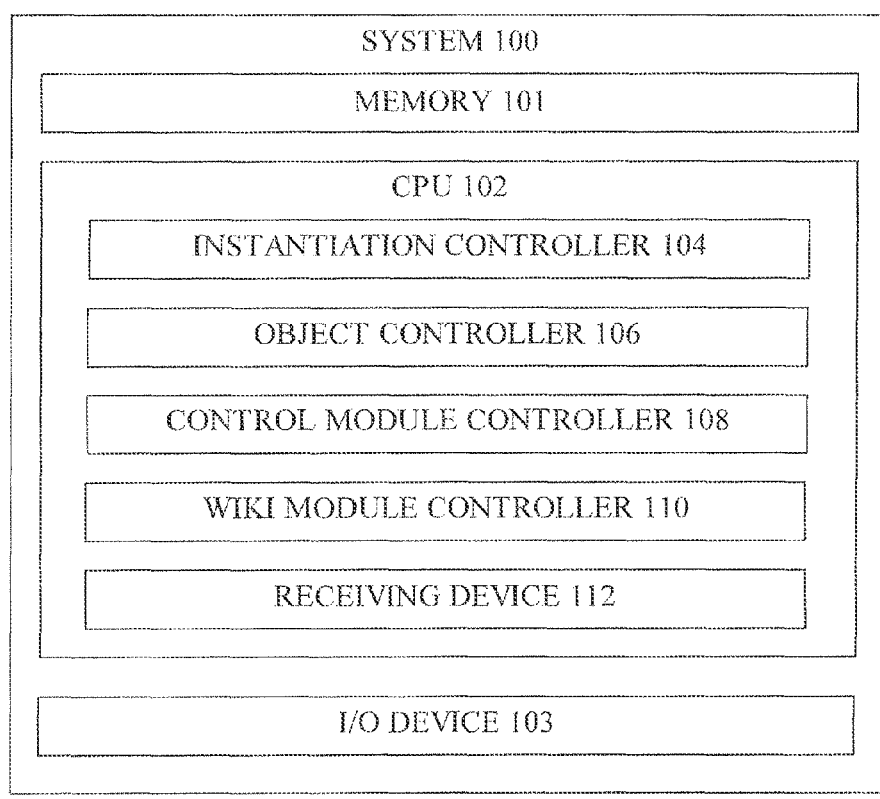
FIG. 3 is a schematic representation of a system configured to instantiate and execute applications with integrated wiki modules.

In certain configurations, system 100 may be configured similarly to device 4, with a display (not shown), an input device (not shown), and a processing device (e.g., CPU 102 as described below). Referring to FIG. 3, system 100 is now described. System 100 may reside on one or more networks 1. System 100 may comprise a memory 101, a central processing unit ("CPU") 102, and an input and output ("I/O") device 103. Memory 101 may store computer-readable instructions that may instruct system 100 to perform certain processes. In particular, memory 101 may store an application program with an integrated wiki module. A plurality of instances of the application may be instantiated on a plurality of devices 4 simultaneously.

Figure 8:
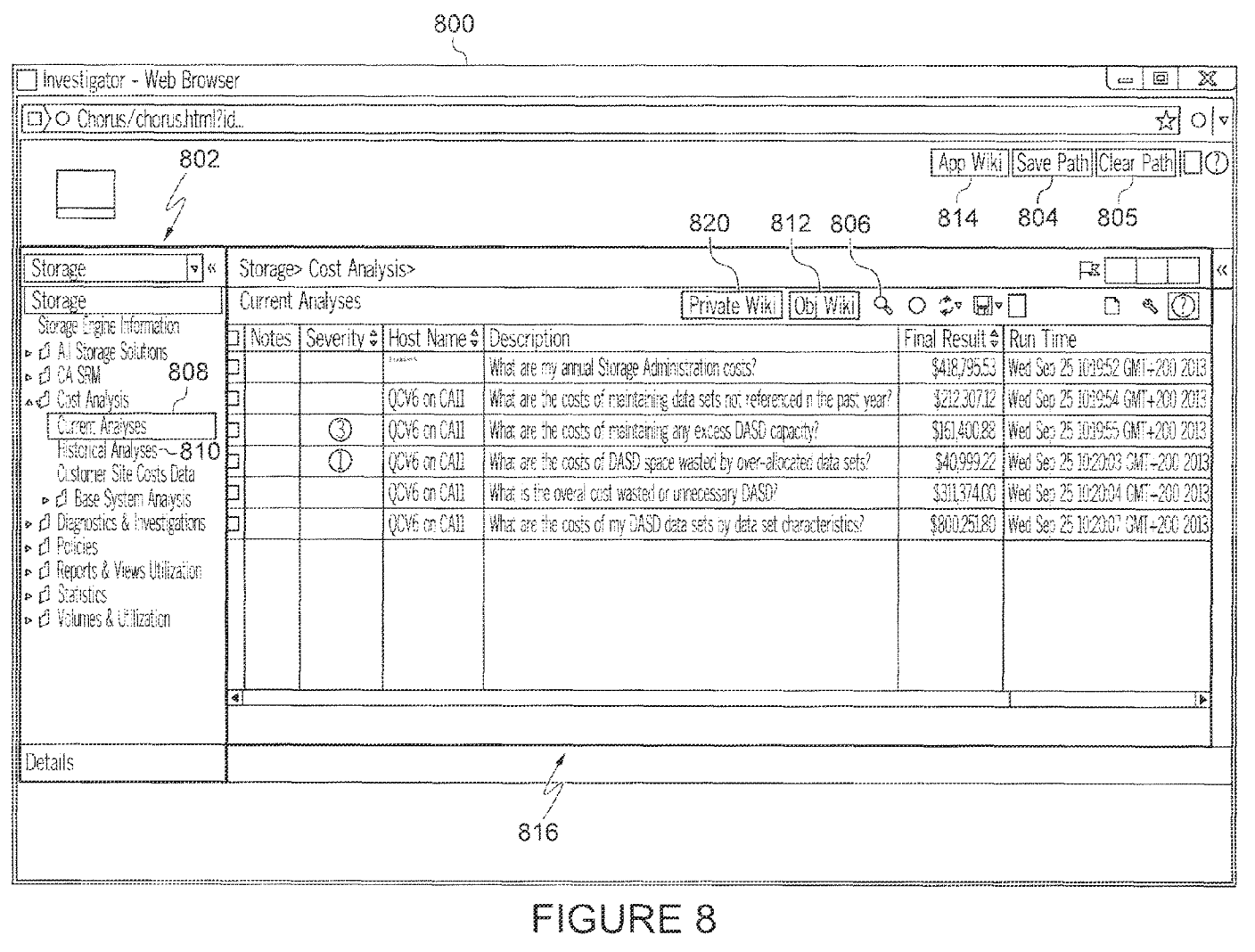

The application program may include a user interface 800 that includes a plurality of control modules and an object tree 802. The control modules may include one or more functional buttons, such as functional buttons 804, 805, 806, which may be used to navigate the application and/or process objects in the application. The object tree 802 may identify a plurality of objects, such as objects 808, 810, related to the application. Each of the plurality of objects may include object content, such as object table 816, which is displayed when the respective object is selected. As shown in FIG. 8, object table 816 corresponds to object 808, which is selected in the object tree 802. The control modules also may include an object wiki button 812 and an application wiki button 814. In some configurations, the control modules may include a private wiki button 820. The application wiki button 814 may be displayed when the application is instantiated on a display, such as display 4a. Functional button 806, object wiki button 812, and private wiki button 820 may be examples of object content buttons that are associated with a particular object and that are displayed on a display when the particular object is selected and displayed on the display.

Figure 9:
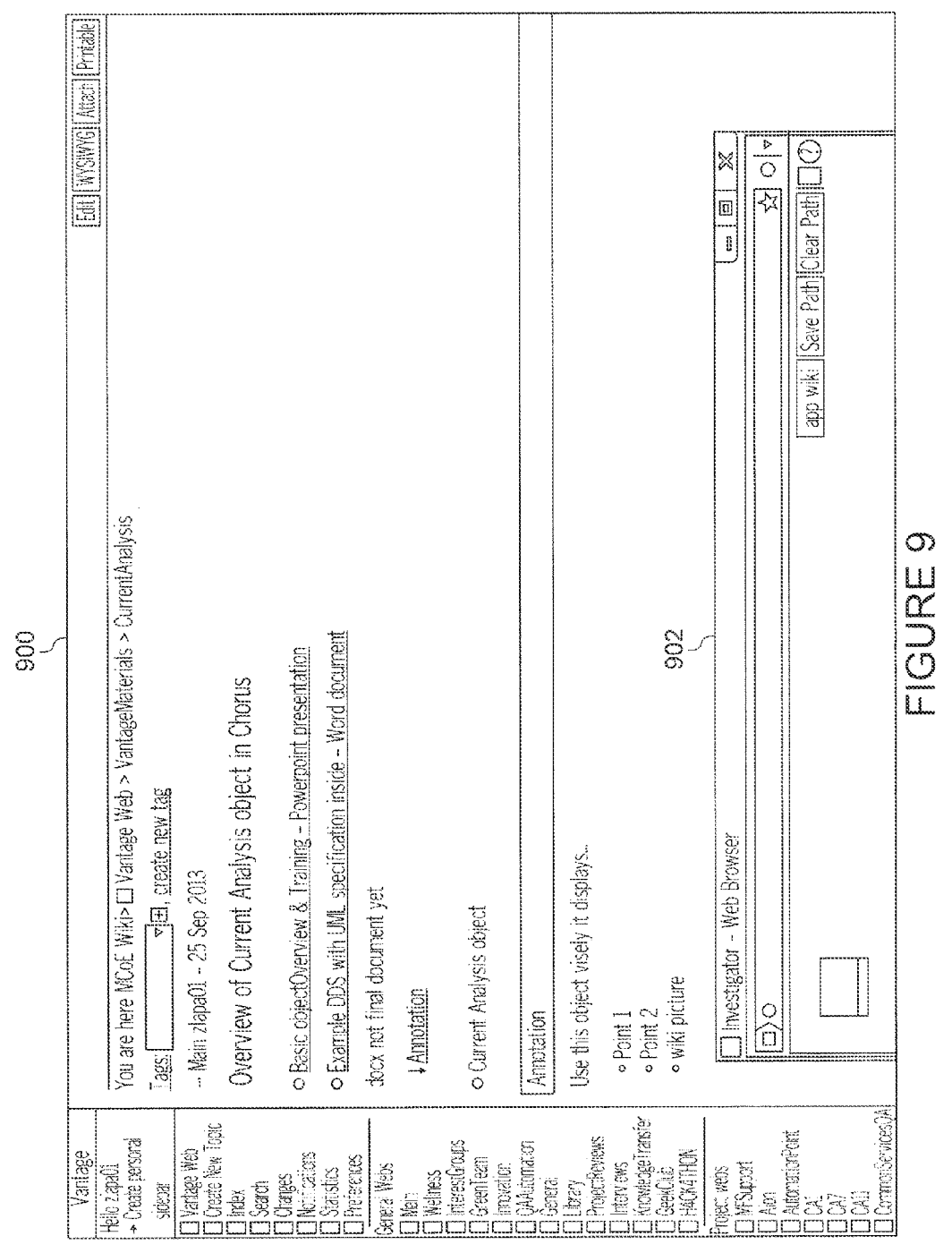
Figure 10:
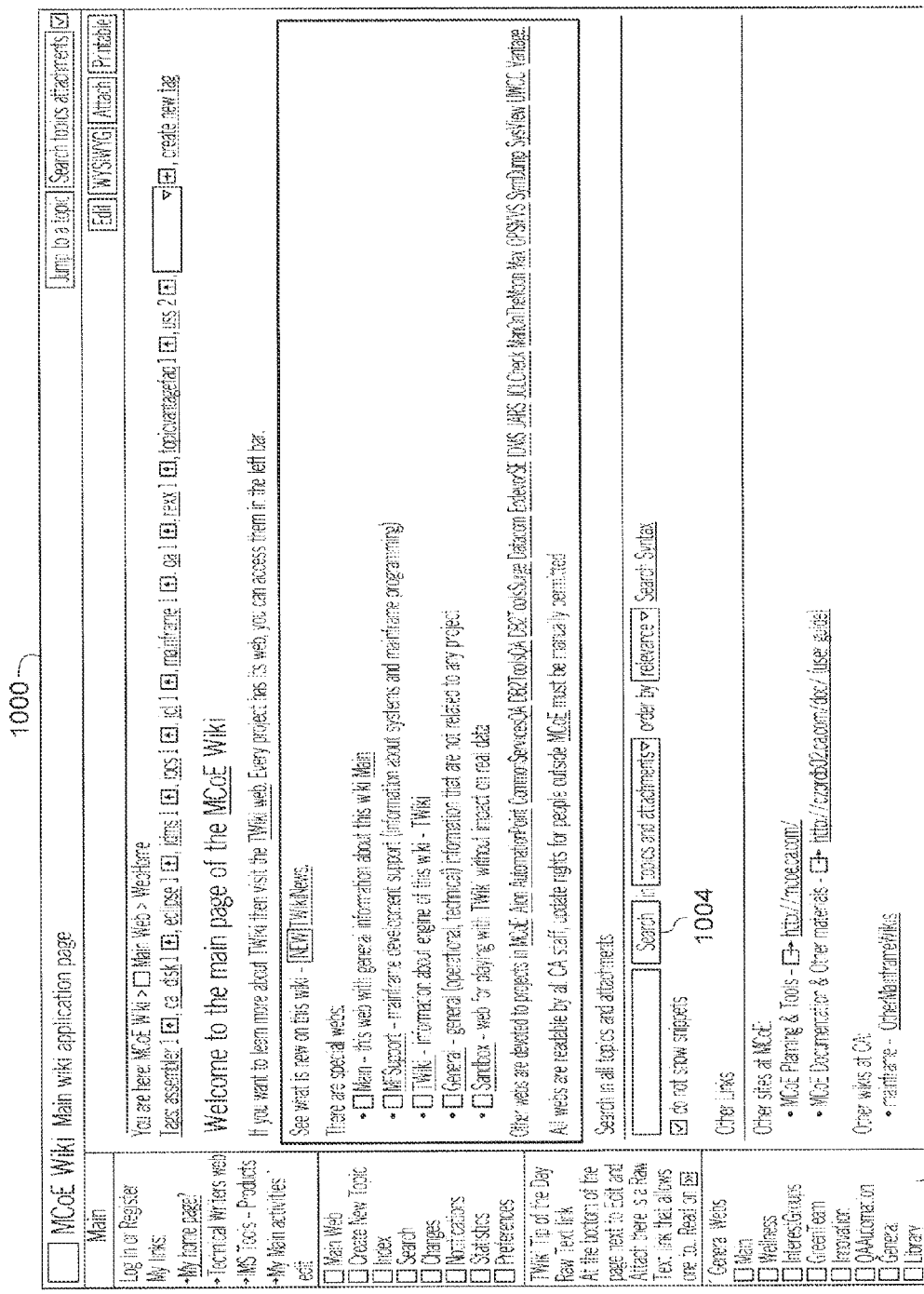
FIG. 10 illustrates a main wiki page for the application of FIG. 8.

The wiki module may include a main wiki page 1000 and a plurality of object wiki pages 900, as shown in FIGS. 9 and 10. The main wiki page 1000 may provide information on how to use a wiki page, information about the application, and information about the plurality of object wiki pages 900. In particular, the main wiki page 1000 may include a list of object wiki tree 1002 that lists the names of (or some other identifier of) all or a portion of the object wiki pages 900 included in the wiki module. In some configurations, the main wiki page 1000 may include a list of the objects in the application. The main wiki page 1000 also may include a search module 1004 in which a search command may be entered. The search command may include a keyword, for example. Alternatively or additionally, the search command may include one or more filter values. Upon receiving the search command via the main wiki page 1000, the wiki module may search aggregate information about the object wiki pages 900 and compile a list of relevant object wiki pages 900 based on the search command. The main wiki page 1000 subsequently may display the compiled list. System 100 may control display 4a to display the main wiki page 1000 in response to receiving an instruction selecting the application wiki button 814 via an instance of the application instantiated on display 4a using input device 4c. Alternatively or additionally, system 100 may control display 4a to display the main wiki page 1000 in response to instantiating an instance of the application on display 4a. In configurations in which private and public object wiki pages 900 are available (described below in more detail) the search module 1004 may search aggregate information about both private and public object wiki pages 900 if the user performing the search is authorized to access such private object wiki pages 900.

Each of the object wiki pages 900 may be associated with an object in the application and may include content associated with such object. The content may include, for example, the name of the associated object, notes about the object, videos about the object, images of the object, tutorials for interacting with the object, hyperlinks to the world-wide web or intranet locations, and other rich content. For example, FIG. 9 shows that the content of object wiki page 900 may include an annotated image of the object 902. The content also may include links to the object itself or to other object wiki pages that, when selected, will control the display to display the object or another object wiki page, respectively. In particular configurations, each object in the application may be associated with at least one object wiki page 900. In some configurations, each object in the application may be associated with a dedicated object wiki page 900 assigned to such object, such that a number of object wiki pages 900 is greater than or equal to the number of objects in the application. System 100 may control display 4a to display an object wiki page 900 associated with a particular object in response to receiving an instruction selecting the object wiki button 812 via an instance of the application instantiated on display 4a using input device 4c or in response to receiving an instruction selecting a link to such object wiki page 900 from another wiki page via an instance of the application instantiated on display 4a using input device 4c. Alternatively or additionally, system 100 may control display 4a to display an object wiki page 900 associated with a particular object in response to selecting the particular object in user interface 800 via an instance of the application instantiated on display 4a using input device 4c.

In some configurations, each object may be associated with at least two object wiki pages 900. In such configurations, one of the at least two object wiki pages 900 associated with an object may be a public object wiki page 900 that may be viewable and/or editable by the public (e.g., all authorized users of the application), and another of the at least two object wiki pages 900 associated with the object may be a private object wiki page 900 that may be viewable and/or editable only by a particular user or a subset of the authorized users of the application. Public object wiki pages 900 and private object wiki pages 900 may be substantially similar, except that private object wiki pages 900 may include private content created by, edited by, or accessible only to the particular user or subset of the authorized users. In other configurations, object wiki pages 900 may include both public and private content wherein the private content may be viewable and/or editable only by a particular user or a subset of the authorized users of the application. In each of these configurations, an authentication process may be performed to verify whether a particular user may access and/or edit the private content. Thus, if a particular user is authorized to view the private content, private wiki button 820 may be displayed in conjunction with an object and/or private content may be available in object wiki page 900.

Figure 11:
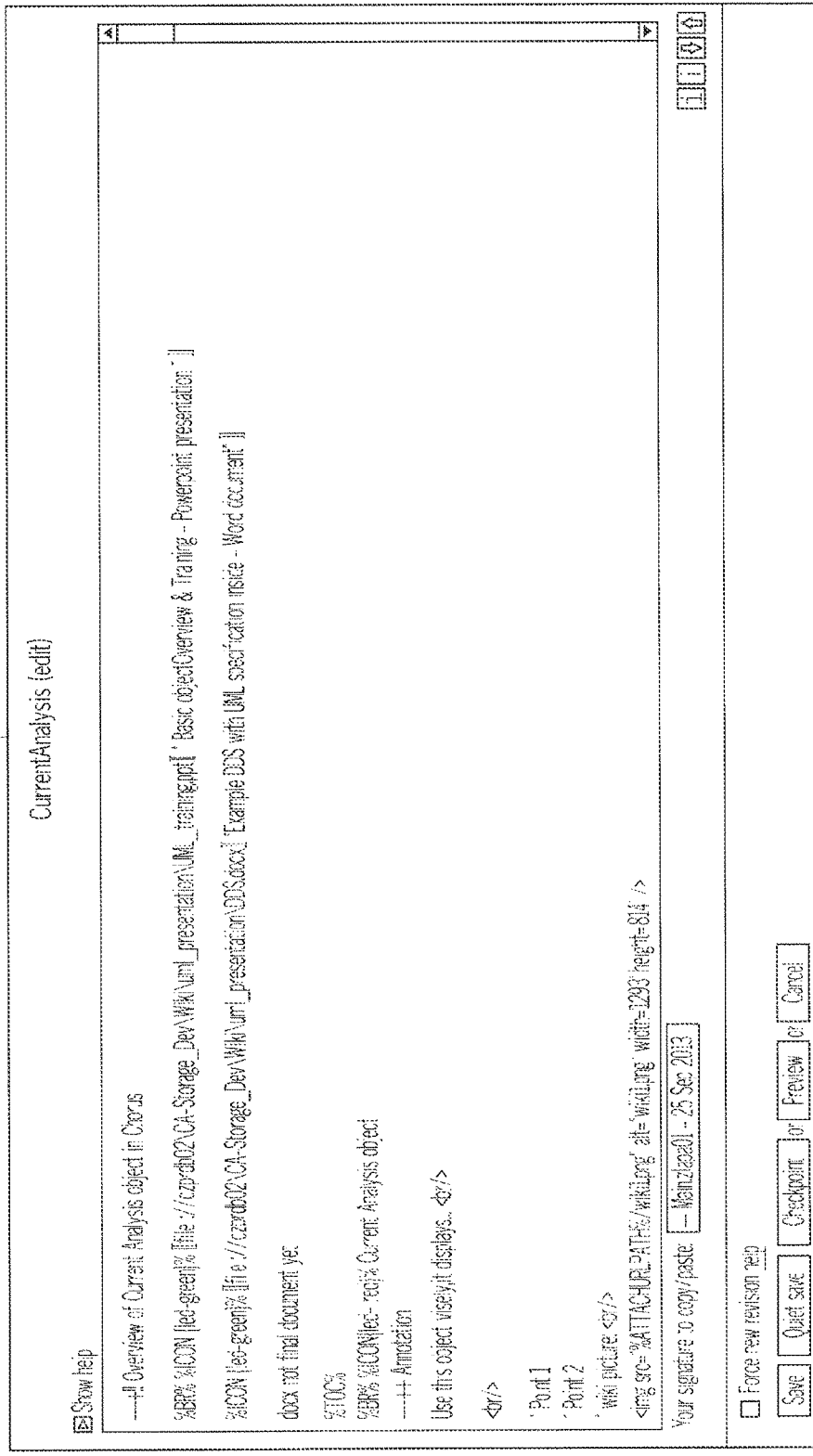
FIG. 11 illustrates an editor for editing wiki pages in the application of FIG. 8.

Referring to FIG. 11, the wiki module also includes an editor 1100 in which a user may edit content of a wiki page (e.g., revise content, remove content from, add content to). Upon receiving a request to edit content via an instance of the application instantiated on display 4a using input device 4c, system 100 may control display 4 to display editor 1100, and the user may edit the content of a wiki page. The editor 1100 may permit editing of object wiki pages 900 and, in some configurations, editing of main wiki page 1000. After edits of content made in the editor 1100 are accepted, the content of the wiki page may be changed for all instances of the application instantiated by system 100. Consequently, when another instance of the application is instantiated on another display 4a and the edited wiki page is to be displayed after the edits are accepted, the other display 4a will display the changed content. Moreover, the editor 1100 may store the history of edits of a wiki page and may enable a user to revert to a previous version of the wiki page. In certain configurations, editor 1100 may only be available under certain conditions (e.g., when a wiki page is accessed through the object wiki button 812 as opposed to through a link from the main wiki page 1000) or to certain users (e.g., only administrators can edit the main wiki page 1000).

Returning to FIG. 3, when computer-readable instructions, such as the application with the integrated wiki module, are executed by CPU 102, the computer-readable instructions stored in memory 101 may instruct CPU 102 to operate as one or more devices. As shown in FIG. 3, for example, CPU 102 may operate as one or more of an instantiation controller 104, an object controller 106, a control module controller 108, a wiki module controller 110, and a receiving device 112. Example functions of these devices are discussed below with respect to FIGS. 4-7B.

I/O device 103 may receive one or more of data from networks 1, data from other devices and sensors connected to system 100, and input from a user and provide such information to CPU 102. I/O device 103 may transmit data to networks 1, may transmit data to other devices connected to system 100, and may transmit information to a user (e.g., display the information, send an e-mail, make a sound). Further, I/O device 103 may implement one or more of wireless and wired communication between system 100 and other devices.

Figure 4:
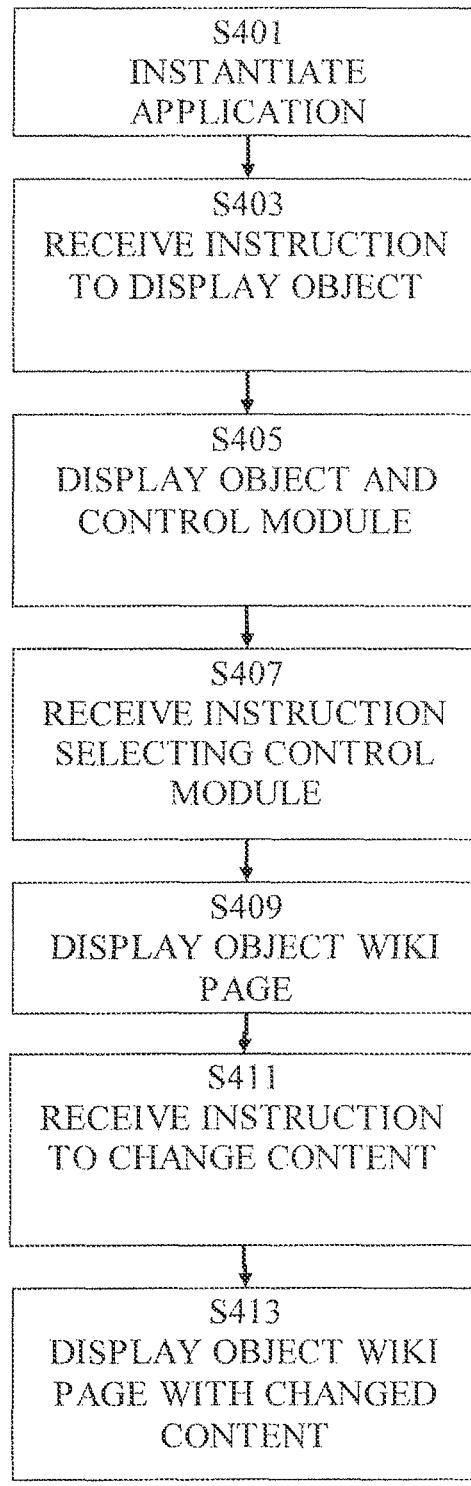
FIG. 4 illustrates a process of instantiating a first instance of an application with an integrated wiki module on a first display and utilizing the application via the first display.

Referring to FIG. 4, an instruction to start an application including an integrated wiki module may be initiated at device 4. System 100 may receive the instruction and, in S401, instantiation controller 104 may instantiate an instance of the application on display 4a by providing processing device 4b with appropriate instructions via I/O device 103. A user at device 4 may use input device 4c to select object 808, for example, in object tree 802. The user's selection is received by processing device 4b and transmitted to receiving device 112 of system 100 via I/O device 103. Thus, in S403, receiving device 112 may receive the instruction to display the contents of object 808. Thereafter, in S405, object controller 106 may control display 4a to display the contents of object 808 and control module controller 108 may control display 4a to display one or more control modules including object wiki button 812. As noted above, object controller 106 and control module controller 108 may be the same device and may perform the processes of S405 as a single process. Private wiki button 820 also may be displayed in S405, if available.

A user at device 4 may use input device 4c to select object wiki button 812. The user's selection is received by processing device 4b and transmitted to receiving device 112 of system 100 via I/O device 103. Thus, in S407, receiving device 112 may receive the instruction selecting object wiki button 812. Thereafter, in S409, wiki module controller 110 may control display 4a to display an object wiki page 900 associated with object 808 in response to receiving the instruction selecting object wiki button 812. The object wiki page 900 associated with object 808 may be displayed in a read-only mode in some configurations. Similarly, receiving device 112 may receive an instruction selecting private wiki button 820, if available, in S407, in such a configuration, wiki module controller 110 may control display 4a to display a private object wiki page 900 associated with object 808 in response to receiving the instruction selecting private wiki button 820.

While viewing the object wiki page 900 associated with object 808, the user at device 4 may, for example, observe an error in the object wiki page 900 associated with object 808. Consequently, the user at device 4 may use input device 4c to provide an instruction selecting an edit mode. The user's selection is received by processing device 4b and transmitted to receiving device 112 of system 100 via device 103. Thereafter, wiki module controller 110 may control display 4a to display the object wiki page 900 associated with object 808 in editor 1100 in response to receiving instruction selecting an edit mode. The user at device 4 may use input device 4c to correct the observed error (or to make other changes, such as adding new content or deleting outdated content) by editing the content of the object wiki page 900. After the user finishes editing, the user may use input device 4c to finalize the edits and generate an instruction for system 100 to change the content of the object wiki page 900 associated with object 808 based on the finalized edits. The user's instruction is received by processing device 4b and transmitted to receiving device 112 of system 100 via I/O device 103. Thus, in S411, receiving device 112 may receive the instruction to change the content of the object wiki page 900 associated with object 808.

Wiki module controller 110 subsequently may change the content of the object wiki page 900 associated with object 808 based on the finalized edits instructed by the user. These changes may be made globally to a plurality of instances of the application instantiated by system 100 (e.g., all versions of the application used by a particular customer, all versions of the application instantiated by the particular system 100) in addition to the instance of the application via which the change was instructed. Thereafter, in S413, wiki module controller 110 may control display 4a to display the object wiki page 900 associated with object 808 reflecting the changes instructed by the user.

Figure 5:
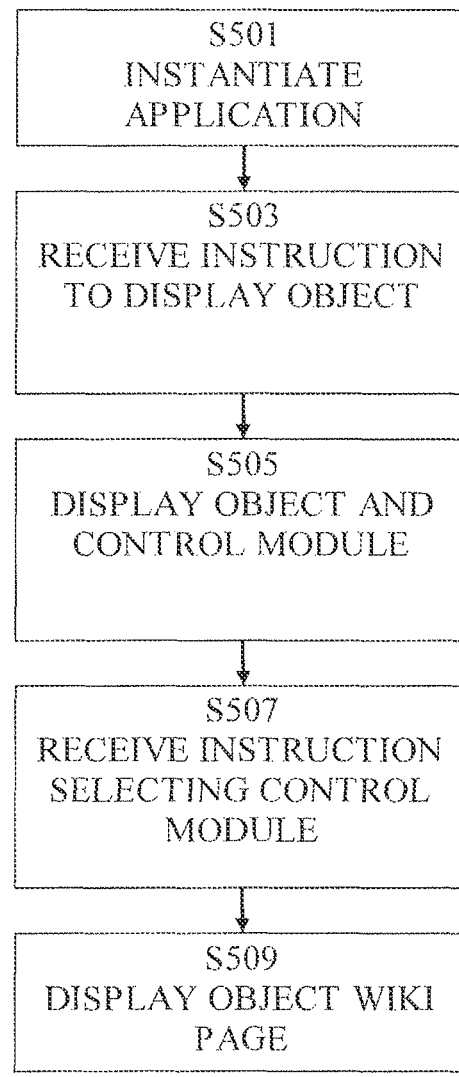
FIG. 5 illustrates a process of instantiating a second instance of the application of FIG. 4 on a second display and utilizing the application via the second display.

Referring now to FIG. 5, another instance of the application instantiated on another device 4 is described. An instruction to start an application including an integrated wiki module may be initiated at another device 4. System 100 may receive the instruction and, in S501, instantiation controller 104 may instantiate another instance of the application on display 4a of the other device 4. A user at the other device 4 also may select object 808, for example. Thus, in S503, receiving device 112 may receive the instruction to display the contents of object 808. Thereafter, in S505, object controller 106 may control display 4a of the other device 4 to display the contents of object 808 and control module controller 108 may control display 4a of the other device 4 to display object wiki button 812. As noted above, object controller 106 and control module controller 108 may be the same device and may perform the processes of S505 as a single process.

A user at the other device 4 may also select object wiki button 812. Thus, in S507, receiving device 1112 may receive the instruction selecting object wiki button 812. Thereafter, in S509, wiki module controller 110 may control display 4a of the other device 4 to display the object wiki page 900 associated with object 808 in response to receiving the instruction selecting object wiki button 812. The content of the object wiki page 900 displayed on display 4a of the other device 4 may reflect the most recent changes to the content of wiki page 900. In other words, if S509 occurs before S411, the content of the object wiki page 900 displayed on display 4a of the other device 4 may reflect the unchanged content. In contrast, if S509 occurs after S411, the content of the object wiki page 900 displayed on display 4a of the other device 4 may reflect the changed content, as changed by another user. Consequently, other users may view the changes made to the content of a wiki page approximately in real-time.

Referring to FIG. 6A, an instruction to start an application including an integrated wiki module may be initiated at device 4. System 100 may receive the instruction and, in S601, instantiation controller 104 may instantiate an instance of the application on display 4a by providing processing device 4b with appropriate instructions via I/O device 103. In S605, system 100 may control display 4a to display an initial application screen, which may include elements of the application interface 800 shown in FIG. 8. In particular, control module controller 108 may control display 4a to display application wiki button 814.

A user at device 4 may use input device 4c to select application wiki button 814. The user's selection is received by processing device 4b and transmitted to receiving device 112 of system 100 via I/O device 103. Thus, in S607, receiving device 112 may receive the instruction selecting application wiki button 814. Thereafter, in S609, wiki module controller 110 may control display 4a to display main wiki page 1000 in response to receiving the instruction selecting application wiki button 814. The main wiki page 1000 associated with object 800 may be displayed in a read-only mode in some configurations. In certain configurations, a user may edit main wiki page 1000 in the same manner disclosed above with respect to FIG. 4 and object wiki page 900. In some configurations, system 100 may control display 4a to display the main wiki page 1000 in response to instantiating an instance of the application on display 4a without requiring selection of application wiki button 814.

As disclosed above, main wiki page 1000 also may include a search module 1004 in which a search command may be entered. The user may desire to search the information about the objects in the application and/or object wiki pages aggregated by the main wiki page 1000. Consequently, the user may use input device 4c to input a search command including one or more keywords and/or filter settings (e.g., types of objects or object wiki pages, dates when objects and/or object wiki pages were last edited and/or created). The user's selection is received by processing device 4b and transmitted to receiving device 112 of system 100 via I/O device 103. Thus, in S611, receiving device 112 may receive the search command. In response to receiving the search command, wiki module controller 110 may, in S613, perform a search of the aggregate information available to the main wiki page 1000 and/or other information available to the wiki module controller 110. In S613, wiki module controller 110 may search aggregate information about the object wiki pages 900 and/or the objects in the application and compile a list of relevant object wiki pages 900, objects based on the search command, and/or other information. In S615, the wiki module controller 110 may control display 4a to display the main wiki page 1000 including the compiled list of information.

The user may select a piece of information displayed on display 4b using input device 4c. For example, the user may select a piece of information from the list of information compiled after receiving a search command and displayed on display 4a in S615. Alternatively, if the search process of S611, S613, and S615 has been omitted or if the search results are not of sufficient utility to the inventor, for example, the user may select a link or other piece of information displayed on main wiki page 1000 that is associated with an object in the application and/or an object wiki page 900. The user's selection is received by processing device 4b and transmitted to receiving device 112 of system 100 via I/O device 103. Thus, in S617, receiving device 112 may receive the selection of the piece of information from the compiled list or from other information displayed on main wiki page 1000. Thereafter, in S619, wiki module controller 110 may control display 4a to display the object associated with the selected piece of information in response to receiving the instruction selecting the piece of information from the compiled list or from other information displayed on main wiki page 1000.

The processes shown in FIG. 6B are substantially similar to the processes shown in FIG. 6A, with the exception that S621 may be different from S619. Specifically, in S621, wiki module controller 110 may control display 4a to display an object wiki page 900 associated with the selected piece of information, rather than the object associated with the object wiki page 900, in response to receiving the instruction selecting the piece of information from the compiled list or from other information displayed on main wiki page 1000. In some configurations, certain pieces of selected information (e.g., links to an object) may trigger S619 and ultimately cause display 4a to display an object, whereas other pieces of selected information (e.g., links to an object wiki page 900) may trigger S620 and ultimately cause display 4a to display an object wiki page 900.

Referring to FIG. 7A, wiki module controller 110 may control display 4a to display an object wiki page 900 in S701, in a manner similar to S409 and S509 disclosed above. The displayed object wiki page 900 may include, for example, hyperlinks (or other types of links) to objects in the application. Such objects may include the object associated with the displayed object wiki page 900 and/or other objects that are not associated directly with the displayed object wiki page 900. A user may select one of the links in the object wiki page 900 using input device 4c. The user's selection is received by processing device 4b and transmitted to receiving device 112 of system 100 via I/O device 103. Thus, in S703, receiving device 112 may receive the selection of a link to a particular object in the application. Thereafter, in S705, object controller 106 may control display 4a to display the content associated with the selected particular object in response to receiving the selection of the link to the particular object in the application. If the content associated with the selected particular object is already displayed on display 4a but is obfuscated or blocked by another window, object controller 106 may control display 4a to bring the content associated with the selected particular object to the front of the windows in the display, for example.

FIG. 7B shows processes similar to the processes shown in FIG. 7A, with the exception that S707 and S709 may be different from S703 and S705. Specifically, the object wiki page 900 displayed on display 4a in S701 may additionally or alternatively include, for example, hyperlinks (or other types of links) to other object wiki pages 900. Such other object wiki pages 900 may also be associated with the same object as the currently displayed object wiki page 900 or may be associated with other objects in the application. Thus, after displaying an object wiki page 900 on display 4a in S701, a user may select one of the links to another object wiki page 900 using input device 4c. The user's selection is received by processing device 4b and transmitted to receiving device 112 of system 100 via I/O device 103. Thus, in S707, receiving device 112 may receive the selection of a link to another object wiki page 900. Thereafter, in S707, object controller 106 may control display 4a to display the other object wiki page 900 in response to receiving the selection of the link to the other object wiki page. If the other object wiki page is already displayed on display 4a but is obfuscated or blocked by another window, object controller 106 may control display 4a to bring the other object wiki page 900 to the front of the windows in the display, for example.

Although many configurations disclosed above contemplate using a cloud-based application executed on system 100, applications with integrated wiki modules may be executed locally on device 4 or other devices using a local processor, such as processing device 4b in place of CPU 102. Changes to the content of wiki pages made via such systems may be transmitted to a centralized system, such as a server 3 or a system 100, such that the changed content is available to the appropriate users of the application.

The flowcharts and diagrams in FIGS. 1-11 illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:
  instantiating a first instance of an application on a first display device, the application including a plurality of objects and an integrated wiki module, the integrated wiki module being integrated into the application and including a plurality of object wiki pages;
  wherein each of the plurality of object wiki pages are dedicated to a respective one of the plurality of objects and include tutorials regarding how to interact with the respective one of the plurality of objects;
  causing the first display device to display a first control module when a first object of the plurality of objects is displayed on the first display device;
  causing the first display device to display a first object wiki page of the plurality of object wiki pages in response to receiving a selection of the first control module via the first instance of the application, the first object wiki page including first content associated with the first object;
  receiving instructions to change the first content included in the first object wiki page via the first instance of the application, such that the first content becomes changed first content;
  instantiating a second instance of the application on a second display device;
  causing the second display device to display the first control module when the first object of the plurality of objects is displayed on the second display device; and
  causing the second display device to display the first object wiki page including the changed first content in response to receiving a selection of the first control module via the second instance of the application after receiving the instructions to change the first content via the first instance of the application; and
  wherein the integrated wiki module further includes a main wiki page, the main wiki page including aggregate information about each object wiki page of the plurality of object wiki pages, and
  wherein the method further comprises:
    causing the first display device to display the main wiki page in response to instantiating the first instance of the application on the first display device; and causing the first display device to display the first object wiki page in response to receiving a selection of a piece of the aggregate information in the main wiki page via the first instance of the application, the piece of the aggregate information being related to the first object wiki page.

2. The method of claim 1,
wherein the changed first content includes a video tutorial recorded by a user of the first display device regarding how to interact with the first object, and
wherein the method further comprises:
   recording, using the first display device, the video tutorial;
   causing the first display device to display a second control module when the first instance of the application is instantiated on the first display device;
   causing the first display device to display the main wiki page in response to receiving a selection of the second control module via the first instance of the application; and
   causing the first display device to display the first object wiki page in response to receiving a selection of a piece of the aggregate information in the main wiki page via the first instance of the application, the piece of the aggregate information being related to the first object wiki page.

3. The method of claim 1,
wherein the method further comprises:
   causing the first display device to display the main wiki page;
   receiving a search command via the search module included in the main wiki page displayed on the first display;
   searching the aggregate information and compiling a list of object wiki pages based on the search command; and
   causing the first display device to display the list of object wiki pages that was compiled based on the search command.

4. The method of claim 1, wherein each object wiki page of the plurality of object wiki pages includes content associated with a respective object of the plurality of objects, such that a number of object wiki pages in the plurality of object wiki pages is greater than or equal to the number of objects in the application.

5. The method of claim 1,
wherein the first content of the first object wiki page includes a link to the first object, and
wherein the method further comprises:
   causing the first display to display the first object when the link to the first object included in the first content of the first object wiki page is selected via the first instance of the application.

6. The method of claim 1,
wherein the first content of the first object wiki page includes a link to a second object wiki page of the plurality of object wiki pages, the second object wiki page including second content associated with a second object of the plurality of objects, and
wherein the method further comprises:
   causing the first display to display the second object wiki page when the link to the second object wiki page included in the first content of the first object wiki page is selected via the first instance of the application.

7. The method of claim 1, wherein the first content includes hypertext markup language content and graphical content.

8. The method of claim 1, further comprising:
   authenticating a user profile accessing the first instance of the application;
   causing the first display device to display a private control module associated with the user profile in response to authenticating the user profile when the first object of the plurality of objects is displayed on the first display device; and
   causing the first display device to display a private object wiki page of the plurality of object wiki pages associated with the user profile in response to receiving a selection of the private control module via the first instance of the application, the private object wiki page including private content associated with the first object that is accessible only by the user profile.

9. A computer program product comprising:
a computer readable storage medium having computer readable program code embodied therewith, the computer readable program code comprising:
   computer readable program code configured to instantiate a first instance of an application on a first display device, the application including a plurality of objects and an integrated wiki module, the integrated wild module being integrated into the application and including a plurality of object wild pages associated with the plurality of objects;
   computer readable program code configured to cause the first display device to display a first control module when a first object of the plurality of objects is displayed on the first display device;
   computer readable program code configured to cause the first display device to display a first object wiki page of the plurality of object wiki pages in response to receiving a selection of the first control module via the first instance of the application, the first object wiki page including first content associated with the first object;
   computer readable program code configured to receive instructions to change the first content included in the first object wiki page via the first instance of the application, such that the first content becomes changed first content;
   computer readable program code configured to instantiate a second instance of the application on a second display device;
   computer readable program code configured to cause the second display device to display the first control module when the first object of the plurality of objects is displayed on the second display device; and
   computer readable program code configured to cause the second display device to display the first object wiki page including the changed first content in response to receiving a selection of the first control module via the second instance of the application after receiving the instructions to change the first content via the first instance of the application; and
wherein the integrated wiki module further includes a main wiki page, the main wiki page including a search module and aggregate information about each object wiki page of the plurality of object wiki pages, and
wherein the computer readable program code further comprises:

computer readable program code configured to cause the first display device to display the main wiki page;

computer readable program code configured to receive a search command via the search module included in the main wiki page displayed on the first display;

computer readable program code configured to search the aggregate information and compiling a list of object wiki pages based on the search command; and computer readable program code configured to cause the first display device to display the list of object wiki pages that was compiled based on the search command.

10. The computer program product according to claim 9, wherein the computer readable program code further comprises:

computer readable program code configured to cause the first display device to display a second control module when the first instance of the application is instantiated on the first display device;

computer readable program code configured to cause the first display device to display the main wiki page in response to receiving a selection of the second control module via the first instance of the application; and computer readable program code configured to cause the first display device to display the first object wiki page in response to receiving a selection of a piece of the aggregate information in the main wiki page via the first instance of the application, the piece of the aggregate information being related to the first object wiki page.

11. The computer program product according to claim 9, wherein the computer readable program code further comprises:

computer readable program code configured to cause the first display device to display the main wiki page in response to instantiating the first instance of the application on the first display device; and computer readable program code configured to cause the first display device to display the first object wiki page in response to receiving a selection of a piece of the aggregate information in the main wiki page via the first instance of the application, the piece of the aggregate information being related to the first object wiki page.

12. The computer program product according to claim 9, wherein each object wiki page of the plurality of object wiki pages includes content associated with a respective object of the plurality of objects, such that a number of object wiki pages in the plurality of object wiki pages is greater than or equal to the number of objects in the application.

13. The computer program product according to claim 9, wherein the first content of the first object wild page includes:

a link to the first object; and a link to a second object wiki page of the plurality of object wild pages, the second object wiki page including second content associated with a second object of the plurality of objects, and wherein the computer readable program code further comprises:

computer readable program code configured to cause the first display to display the first object when the link to the first object included in the first content of the first object wiki page is selected via the first instance of the application; and computer readable program code configured to cause the first display to display the second object wiki page when the link to the second object wiki page included in the first content of the first object wiki page is selected via the first instance of the application.

14. A system comprising:

a first instantiation controller configured to instantiate a first instance of an application on a first display device, the application including a plurality of objects and an integrated wiki module, the integrated wiki module being integrated into the application and including a plurality of object wiki pages associated with the plurality of objects;

a first control module controller configured to cause the first display device to display a first control module when a first object of the plurality of objects is displayed on the first display device;

a first wiki module controller configured to cause the first display device to display a first object wiki page of the plurality of object wiki pages in response to receiving a selection of the first control module via the first instance of the application, the first object wiki page including first content associated with the first object;

a receiving device configured to receive instructions to change the first content included in the first object wiki page via the first instance of the application, such that the first content becomes changed first content;

a second instantiation controller configured to instantiate a second instance of the application on a second display device;

a second control module controller configured to cause the second display device to display the first control module when the first object of the plurality of objects is displayed on the second display device; and a second wiki module controller configured to cause the second display device to display the first object wiki page including the changed first content in response to receiving a selection of the first control module via the second instance of the application after receiving the instructions to change the first content via the first instance of the application; and wherein the first content of the first object wild page includes:

a link to the first object; and a link to a second object wiki page of the plurality of object wild pages, the second object wiki page including second content associated with a second object of the plurality of objects, wherein the first wiki module controller is further configured to cause the first display to display the second object wiki page when the link to the second object wiki page included in the first content of the first object wiki page is selected via the first instance of the application, and wherein the system further comprises an object controller configured to cause the first display to display the first object when the link to the first object included in the first content of the first object wiki page is selected via the first instance of the application.

15. The system according to claim 14, wherein the integrated wiki module further includes a main wiki page, the main wiki page including aggregate information about each object wiki page of the plurality of object wiki pages, wherein the first control module controller is further configured to cause the first display device to display a second control module when the first instance of the application is instantiated on the first display device, wherein the first wiki module controller is further configured to cause the first display device to display the main wiki page in response to receiving a selection of the second control module via the first instance of the application, and wherein the first wiki module controller is further configured to cause the first display device to display the first object wiki page in response to receiving a selection of a piece of the aggregate information in the main wiki page via the first instance of the application, the piece of the aggregate information being related to the first object wiki page.

16. The system according to claim 14, wherein the integrated wiki module further includes a main wiki page, the main wiki page including aggregate information about each object wiki page of the plurality of object wiki pages, wherein the first wiki module controller is further configured to cause the first display device to display the main wiki page in response to instantiating the first instance of the application on the first display device, and wherein the first wiki module controller is further configured to cause the first display device to display the first object wiki page in response to receiving a selection of a piece of the aggregate information in the main wiki page via the first instance of the application, the piece of the aggregate information being related to the first object wiki page.

17. The system according to claim 14, wherein the integrated wiki module further includes a main wiki page, the main wiki page including a search module and aggregate information about each object wiki page of the plurality of object wiki pages, and wherein the first wiki module controller is further configured to cause the first display device to display the main wiki page, wherein the receiving device is configured to receive a search command via the search module included in the main wiki page displayed on the first display, wherein the first wiki module controller is further configured to search the aggregate information and compiling a list of object wiki pages based on the search command; and wherein the first wiki module controller is further configured to cause the first display device to display the list of object wiki pages that was compiled based on the search command.

18. The system according to claim 14, wherein each object wiki page of the plurality of object wiki pages includes content associated with a respective object of the plurality of objects, such that a number of object wiki pages in the plurality of object wiki pages is greater than or equal to the number of objects in the application.

\* \* \* \* \*